Aug. 14, 1923.

C. E. STARR 1,464,887

VEHICLE DRIVING GEAR

Filed June 28, 1921

INVENTOR
*Charles E. Starr*
BY
*Horace Barnes*
ATTORNEY

Patented Aug. 14, 1923.

1,464,887

UNITED STATES PATENT OFFICE.

CHARLES E. STARR, OF BELLINGHAM, WASHINGTON, ASSIGNOR TO PERFECTO GEAR DIFFERENTIAL CO., OF OAKLAND, CALIFORNIA, A CORPORATION OF WASHINGTON.

VEHICLE DRIVING GEAR.

Application filed June 28, 1921. Serial No. 481,162.

*To all whom it may concern:*

Be it known that I, CHARLES E. STARR, a citizen of the United States, and a resident of the city of Bellingham, county of Whatcom, State of Washington, have invented certain new and useful Improvements in Vehicle Driving Gears, of which the following is a specification.

This invention relates to improvements in power transmissions for motor vehicles and is an improvement in the power transmission shown and described in my copending application, Serial No. 194,324, filed October 2, 1917.

The object of this improvement is to provide a strong and durable speed reduction gearing for the driving wheels of a motor vehicle that is simple in construction and that may be disposed within a housing located on the outer side of the hub portion of the wheel.

A further object is to provide simple and reliable means within the hub of the wheel whereby the gear ratio between the wheel and the driving axle may be varied.

By mounting the driving mechanism in a gear box that is located on the outside of the wheel I am enabled to dispense with several parts that are necessary in the device disclosed in my prior application hereinabove referred to and at the same time retain the more desirable elements.

This device may be advantageously used in converting ordinary automobiles or pleasure cars into trucks or tractors, or it may be used in the manufacture of new trucks or tractors. It may also be advantageously used on pleasure cars for the purpose of providing an emergency gear of lower speed than is ordinarily afforded by the change speed gears of such cars.

It will be understood that the power transmission herein disclosed is the same in both of the driving wheels of a motor vehicle and the following description should be so construed, it being necessary to illustrate and describe only one of the transmission units.

The invention consists in the novel construction, adaptation and combination of parts of a variable speed power transmission as will be more clearly hereinafter described and claimed.

Figure 1:
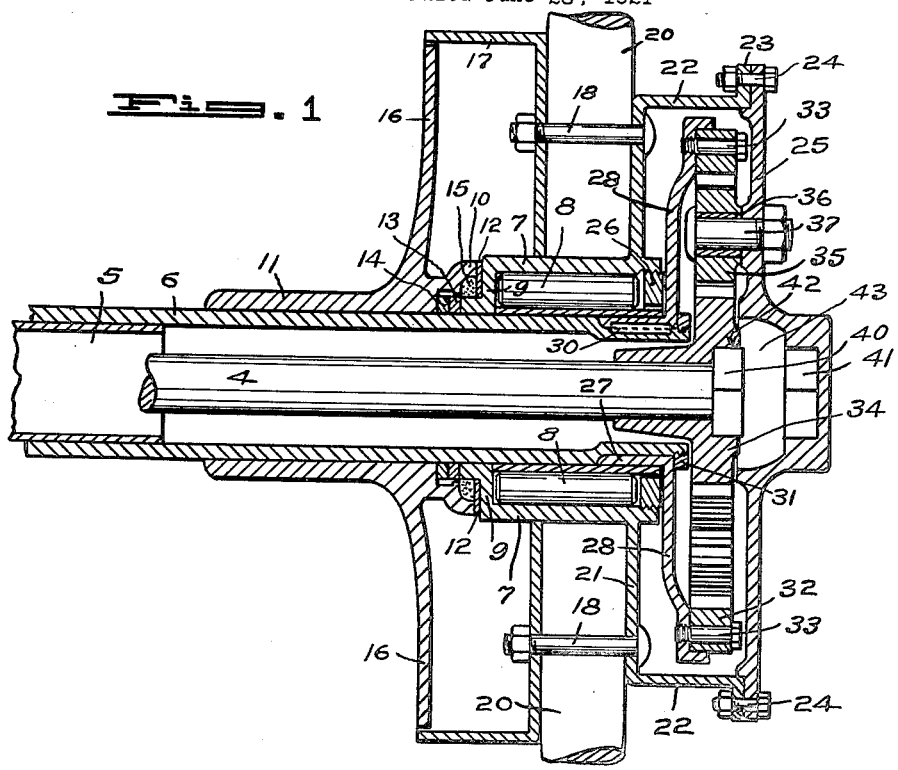
Figure 2:
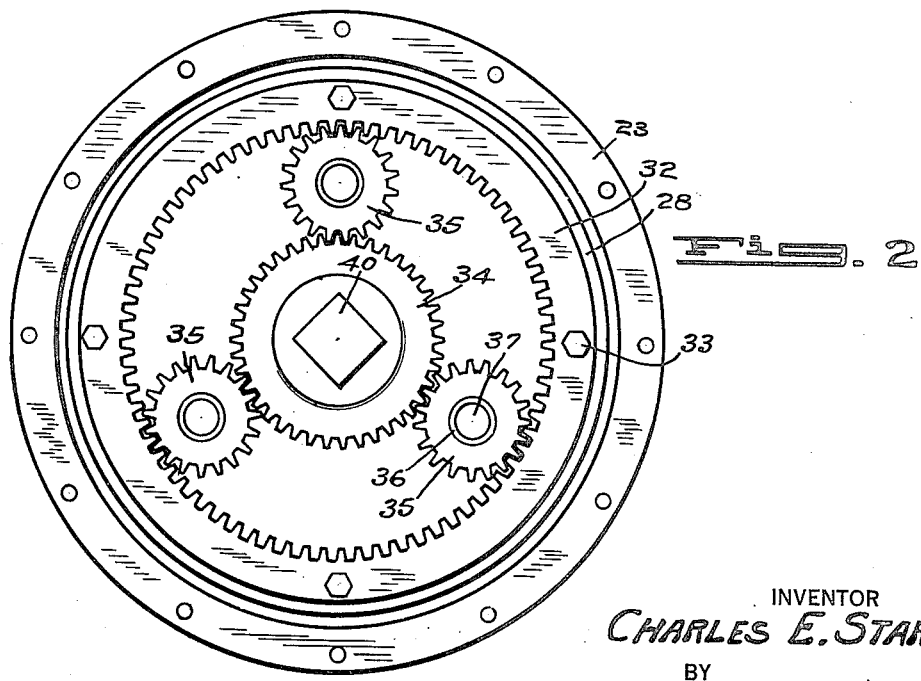

In the accompanying drawings Figure 1 is a view in cross section illustrating a power transmission constructed in accordance with this invention as it may appear when applied to one of the driving wheels of a motor vehicle and Fig. 2 is a view in elevation of the transmission shown in Fig. 1 as it would appear with the cover plate removed.

Referring to the drawings throughout which like reference numerals designate like parts, the numeral 4 designates one of the differential driving axles or shafts of a motor vehicle and 5 designates a fixed housing for such axle, both of these parts being of well known standard form of construction.

6 is a tubular extension that is adapted to fit over the end of the housing 5 and project outwardly therefrom, this extension being in effect a part of the housing and the two extensions on oppositely disposed wheels being rigidly connected together by any suitable form of bolster connection as for instance by the form of truss bolster shown in my co-pending application hereinbefore referred to.

7 is a bearing member forming a portion of the hub of a wheel and is journaled on the fixed housing extension 6 by means of roller bearings 8. The inner end of the bearing member 7 is turned inwardly as at 9 to form a stop for the roller bearings 8 and is prevented from moving endwise on the housing 6 by the end 10 of a sleeve 11 that is fixedly mounted on the housing extension 6.

The inner end 10 of the sleeve 11 is separated from the member 9 by bearing washers or rings 12, 13 and 14, and is provided with a packing ring 15 to prevent the escape of lubricating fluid.

The sleeve 11 is flanged as at 16 to form a closure or end for a brake drum 17 that is fixedly secured by bolts 18 to the spokes 20 of the wheel.

The bearing member 7 is flanged as at 21, is then turned outwardly as at 22 to form a drum or a housing and is then provided with a relatively narrow peripheral flange 23 that is perforated for the reception of bolts 24 by which it is fixedly secured to a cover plate 25.

The outer end of the bearing member 7 is internally threaded for the reception of a threaded washer 26 that serves as a stop or end for the chamber within which the bearing rollers 8 are located. The outer end of the extension 6 is of slightly reduced diameter and is adapted to have the hub portion 27 of a flange or plate 28 fitted thereover, such hub portion being fixedly secured to the housing 6 by a key 30 and nut 31. The peripheral portion of the plate 28 is adapted to have an internally toothed ring gear 32 concentrically secured thereto by bolts 33.

The driving mechanism consists of a driving pinion 34 that is provided on the axle 4 and is adapted to mesh with a plurality of intermediate or idler gears 35 which in turn mesh with the internal ring gear 32. The idler gears 35 are rotatably mounted on bushings 36 that are fixedly secured to the cover plate 25 by bolts 37.

When the pinion 34 is driven by rotation of the axle 4 it will cause the idler gears 35 to roll around within the fixed ring gear 32 and thereby rotate the wheel to which the cover plate 25 is rigidly secured, at a lesser velocity than the axle 4 thereby giving a gearing of reduced speed.

For the purpose of providing a high and a low speed drive and also a neutral position the device is so constructed that the axle 4 may be selectively locked to the pinion 34 or the cover plate 25 forming part of the ring gear housing. This is accomplished by forming preferably a square shaped driving head 40 on the end of the differential axle 4 and providing correspondingly shaped recesses 41 and 42 in the cover plate 25 and pinion 34 for the reception of the driving head, the face of the pinion 34 and the wall of the cover plate 25 being spaced far enough apart at the location of the recesses to permit the driving head to be entirely withdrawn from both of the recesses into a neutral position where it may turn freely without driving the wheel.

The axle 4 is adapted to be moved lengthwise within the housing 5 so that the head 40 may be selectively positioned within either of the recesses 41 and 42, or may be withdrawn from both of such recesses. The recesses 41 and 42 and the driving head thus constitute clutch members, optionally engageable to lock the shaft for rotation either with the driving gear, or the ring gear housing.

When the head 40 is within the recess 42 in the pinion 34 the pinion will be locked to the axle 4 and as it rotates therewith will cause the idler gears 35 to roll around within the internal gear 32 and carry the wheel with them, the force that turns the wheel being transmitted through the bolts 37 and cover plate 25 to the housing 22 that is a fixed part of the wheel and that wheel being rotated at a slower speed than the axle 4.

When the head 40 is positioned within the recess 41 in the cover plate 25 the wheel will be driven directly by and at the same speed as the axle thereby constituting a high speed drive and the gears 35 and pinion 34 will run idly.

When the head 40 of the shaft 4 is disengaged from both recesses 41 and 42 by positioning it mid-way between such two recesses the axle 4 may rotate freely without turning the wheel thereby constituting a neutral position.

If it is not desired to effect a change in the gear ratio within this transmission the recesses 41 and 42 may be done away with and the driving pinion 34 may be keyed or splined on the axle 4.

Any suitable means for effecting the shifting or longitudinal movement of the axle 4 as for instance, the means shown and described in my co-pending application hereinbefore referred to may be used, it being understood that the axle 4 and the corresponding axle on the opposite side of the vehicle are to be shifted simultaneously.

When this form of transmission is used in re-built trucks and tractors the original change speed gear of the motor vehicle may be retained if desired and this mechanism may serve as an additional means of reducing the gear ratio.

It is obvious that changes in the form of construction of the various parts of this transmission may be resorted to within the scope of the appended claims.

I claim—

1. A vehicle driving gear comprising a fixed housing, a wheel journaled on said housing, a ring gear fixed on said housing on the outer side of said wheel, a housing fixed on said wheel and enclosing said ring gear, an intermediate gear journaled on said ring gear housing and in mesh with said ring gear, a driving shaft in said fixed housing, a driving gear on said shaft in mesh with said intermediate gear, and means for optionally connecting said shaft for rotation with said driving gear or with said ring gear housing.

2. A vehicle driving gear comprising a fixed housing, a wheel journaled on said housing, a ring gear fixed on said housing on the outer side of said wheel, a housing fixed on said wheel and enclosing said ring gear, an intermediate gear journaled on said ring gear housing and in mesh with said ring gear, a longitudinally movable driving shaft in said fixed housing, a driving gear on said shaft in mesh with said intermediate gear, and clutch members on said shaft, driving gear and ring gear housing whereby longitudinal movement of said shaft locks it for rotation with said driving gear or with said ring gear housing.

3. A vehicle driving gear comprising a fixed housing, a wheel journaled on said housing, a ring gear fixed on said housing on the outer side of said wheel, a housing fixed on said wheel and enclosing said ring gear, an intermediate gear journaled on said ring gear housing and in mesh with said ring gear, a longitudinally movable driving shaft in said fixed housing, a driving head on said shaft, a driving gear on said shaft in mesh with said intermediate gear and formed with a recess complementary to said driving head, said ring gear housing also being provided with a recess complementary to said driving head whereby longitudinal movement of said shaft seats said driving head in said driving gear or in said ring gear housing.

4. The combination with a differential axle having an outer end comprising a driving head, of a fixed housing for said axle, a wheel mounted for rotation on said housing, a gear box provided on the outer side of said wheel, a cover plate secured on said gear box, said cover plate having a recess complementary to said driving head in its central portion, an internal gear rigidly supported by said housing and disposed within said gear box in concentric relation to said axle, a driving pinion mounted on said differential axle and having a recess complementary to said driving head therein, said axle being adapted to be moved lengthwise to selectively position the driving head thereof within the recess of said pinion or within said recess in said cover plate, or to disengage said driving head from both of said recesses, and idler gears rotatably mounted on bearings that are fixedly secured to said cover plate, said idler gears being adapted to mesh with said driving pinion and with said internal gear.

5. The combination with a longitudinally movable rotatable shaft of a fixed housing therefor, a wheel rotatably mounted on the outer end of said housing, and having a cover plate that is provided with a centrally located recess, a plate rigidly secured to the outer end of said housing, an internal gear secured on said plate in concentric relation to said shaft, a driving pinion mounted on said shaft and having a recess on its outer face, idler gears rotatably mounted on fixed pintles that are connected with said cover plate and meshing with said driving pinion and said internal gear, and means on the end of said shaft for entering said recess in said driving pinion or said recess in said cover plate to selectively establish different driving connections when said shaft is moved lengthwise within said housing.

6. The combination with a longitudinally movable differential axle and a housing therefor, of a wheel rotatably mounted on the outer end of said housing, a gear case secured to the outer side of the hub portion of said wheel, and having a centrally located recess therein, speed reduction gears provided in said gear case, one of said gears having a recess therein and a head on said differential axle adapted to be selectively moved into said recess in said gear or said recess in said housing, to establish driving connections of different relative speed between said axle and said wheel.

7. The combination with a longitudinally movable differential axle and a fixed housing therefor, of a squared outer end portion on said axle, a wheel having a hub portion adapted to fit over the outer end of said housing, a roller bearing interposed between said wheel and said housing, thrust rings for preventing movement of said hub portion lengthwise of said housing, a packing ring for preventing the escape of lubricant, a plate rigidly secured to the outer end of said housing, an internally toothed ring gear secured to said plate, a gear housing rigidly secured to the outer side of said wheel, a cover plate adapted to be fixedly secured to said first named housing, said cover plate having a concentrically arranged squared recess provided therein, a driving pinion provided on the outer end of said differential axle, said driving pinion having a squared recess for the reception of the outer squared end of said axle, the recess in said driving pinion being spaced from the recess in said cover plate to afford a neutral position therebetween for the squared end of said axle and a plurality of idler gears mounted for rotation on said cover plate and meshing with said pinion and said internal gear.

Signed at Seattle, Washington, this 23rd day of June, 1921.

CHARLES E. STARR.